United States Patent
Manchanda

(10) Patent No.: US 8,419,107 B2
(45) Date of Patent: Apr. 16, 2013

(54) RETRACTABLE VEHICLE SHADE FOR TROPICAL AND COLD CLIMATES

(76) Inventor: Ramesh Chander Manchanda, New Delhi (IN)

( * ) Notice: Subject to any disclaimer, the term of this patent is extended or adjusted under 35 U.S.C. 154(b) by 0 days.

(21) Appl. No.: 13/255,933

(22) PCT Filed: Mar. 29, 2010

(86) PCT No.: PCT/IN2010/000193
§ 371 (c)(1), (2), (4) Date: Sep. 28, 2011

(87) PCT Pub. No.: WO2010/109491
PCT Pub. Date: Sep. 30, 2010

(65) Prior Publication Data
US 2012/0007385 A1    Jan. 12, 2012

(30) Foreign Application Priority Data
Mar. 27, 2009    (IN) .............................. 633/DEL/2009

(51) Int. Cl.
*B60J 11/04*    (2006.01)
(52) U.S. Cl.
USPC ...................................................... 296/136.1
(58) Field of Classification Search ................. 296/97.4, 296/136.01, 136.1–13
See application file for complete search history.

(56) References Cited

U.S. PATENT DOCUMENTS

| | | | |
|---|---|---|---|
| 4,848,827 A | 7/1989 | Ou | |
| 5,244,246 A * | 9/1993 | Cunningham | 296/136.11 |
| 5,518,289 A * | 5/1996 | Cobble | 296/136.1 |
| 6,168,225 B1 | 1/2001 | Deng et al. | |
| 6,206,451 B1 | 3/2001 | Maano | |
| 7,137,661 B2 * | 11/2006 | Neuer et al. | 296/136.01 |
| 7,172,234 B2 * | 2/2007 | Chang | 296/95.1 |
| 8,070,211 B2 * | 12/2011 | Suh | 296/136.01 |
| 8,146,984 B2 * | 4/2012 | Devereaux | 296/136.02 |
| 2004/0135393 A1 * | 7/2004 | Neuer et al. | 296/136.1 |
| 2004/0201244 A1 * | 10/2004 | Neuer et al. | 296/136.1 |
| 2004/0238089 A1 * | 12/2004 | Li et al. | 150/166 |
| 2006/0055201 A1 * | 3/2006 | Neuer et al. | 296/136.11 |
| 2006/0162873 A1 * | 7/2006 | Dao | 160/122 |
| 2007/0096501 A1 * | 5/2007 | Tan | 296/136.1 |
| 2009/0072578 A1 * | 3/2009 | Wang | 296/136.12 |

FOREIGN PATENT DOCUMENTS

DE    20310706 U1    10/2003

* cited by examiner

*Primary Examiner* — H Gutman
(74) *Attorney, Agent, or Firm* — Ladas & Parry LLP

(57) ABSTRACT

A retractable vehicle shade is provided for vehicles which includes a hollow central box, a front sliding panel, and a rear sliding panel. The hollow central box is mounted on a rooftop of the vehicle. The front sliding panel is slidingly fitted into the box through a slot at the front end and configured to cover at least front glass pane. The rear sliding panel is slidingly fitted into the box through the slot at the rear end and configured to cover at least rear glass pane. The vehicle shade can further include a detach-ably attached water-proof stretchable fabric member for providing a datable layer over respective panels and central box. The fabric member has one or more elastic members which causes it to fold up along the end portions of the sliding panels on the top of box, when the panels are retracted backwards into the box.

10 Claims, 9 Drawing Sheets

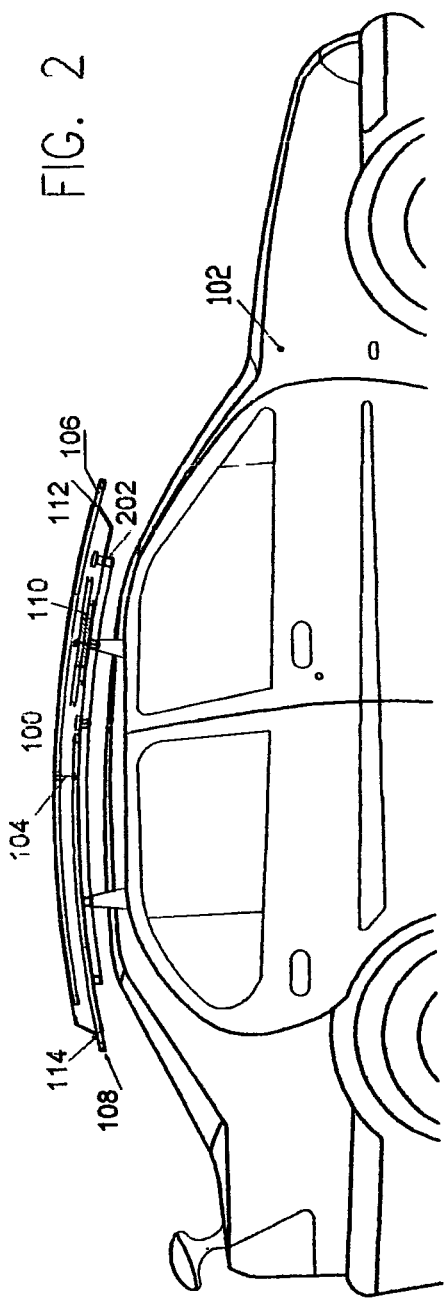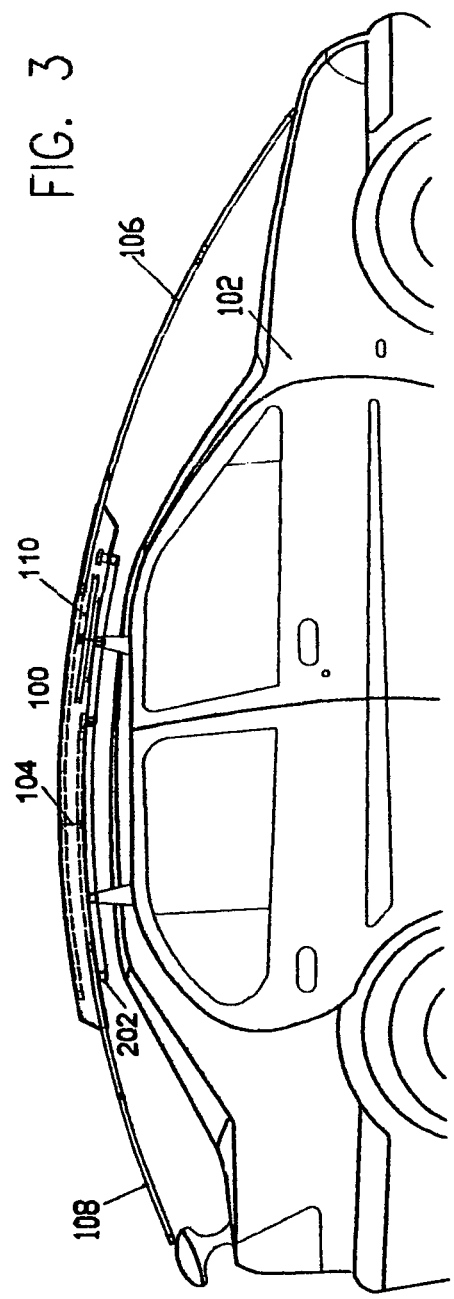

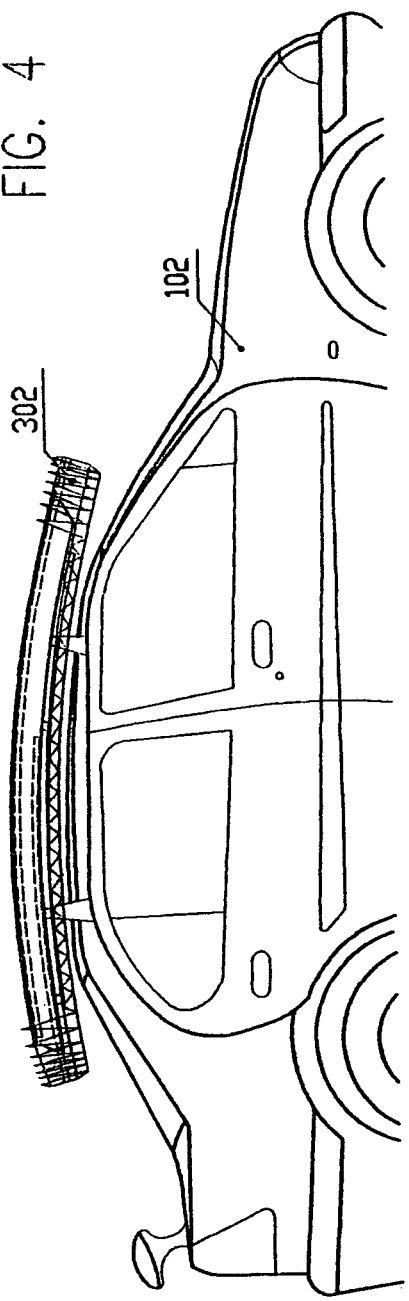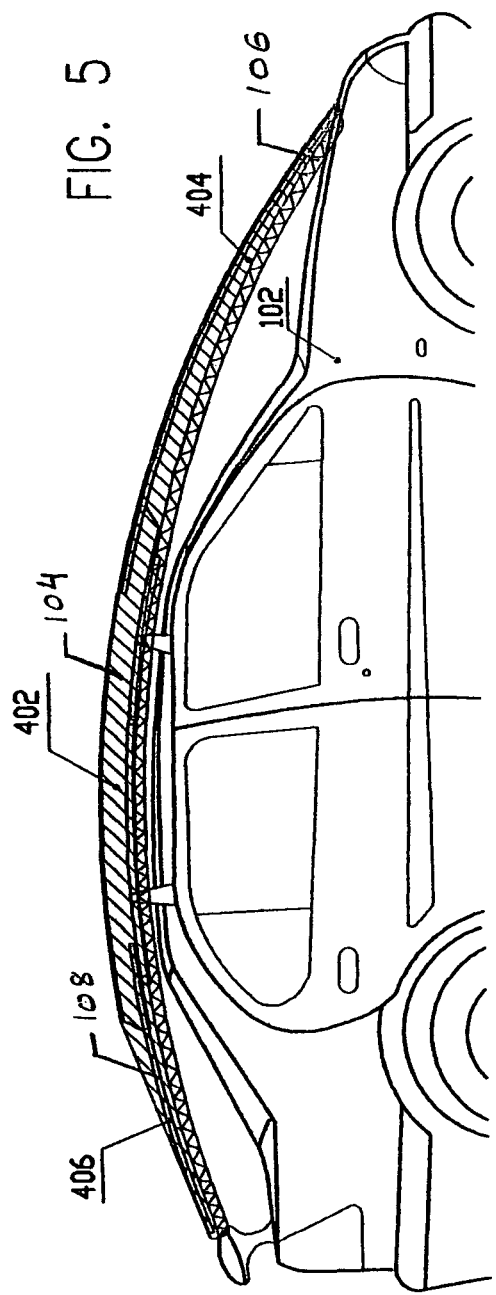

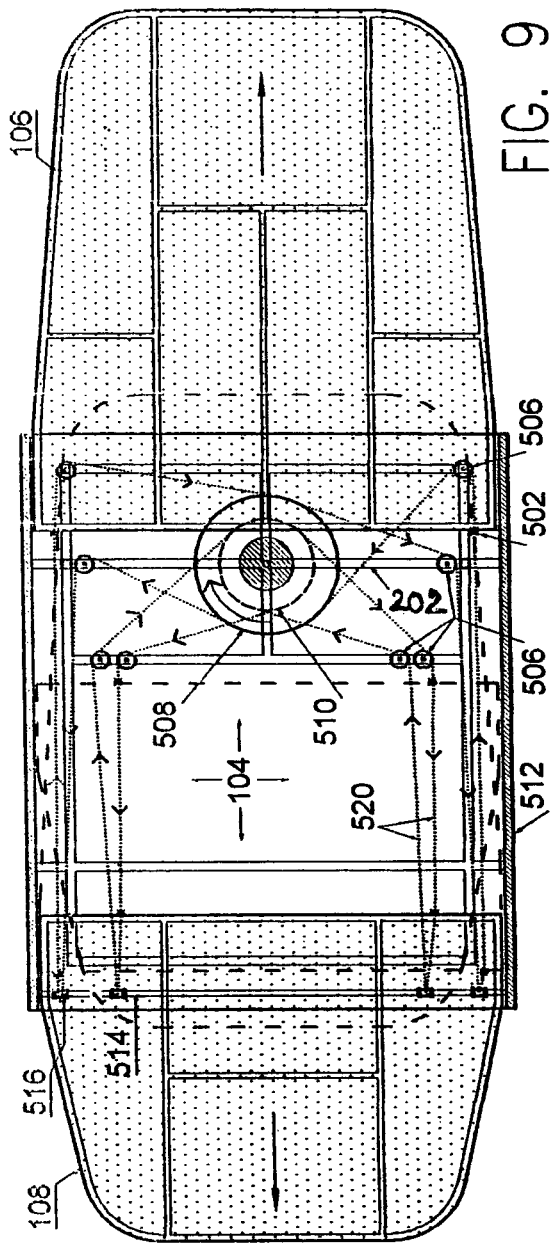
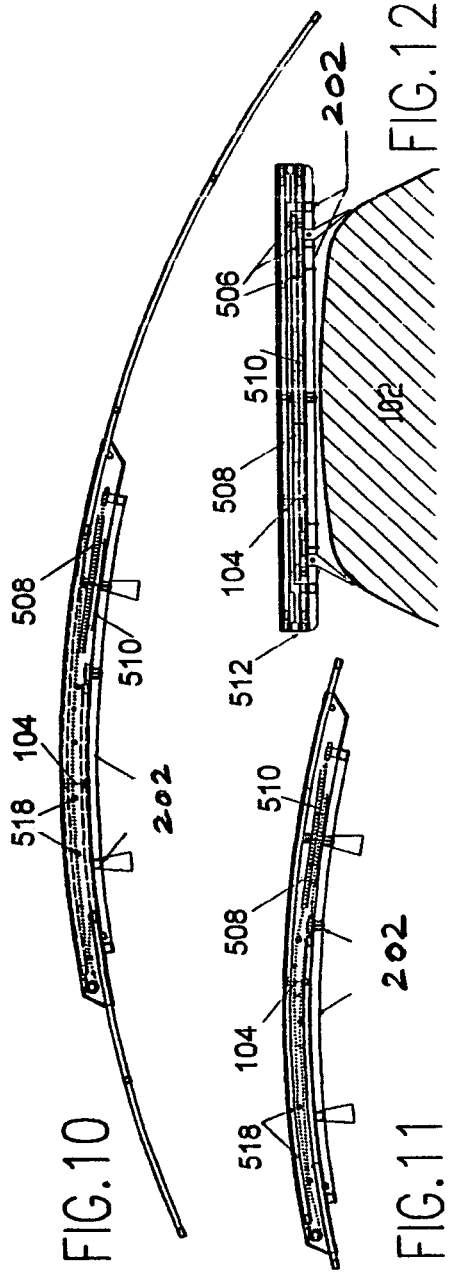
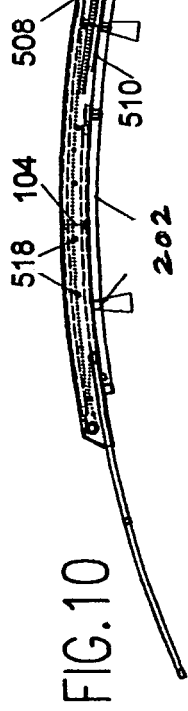

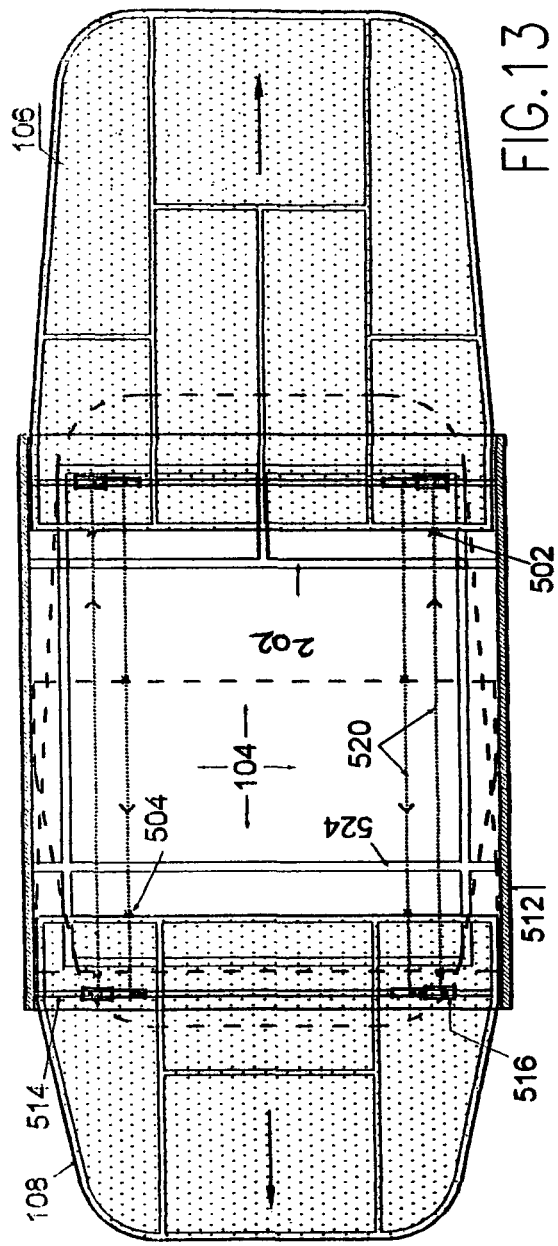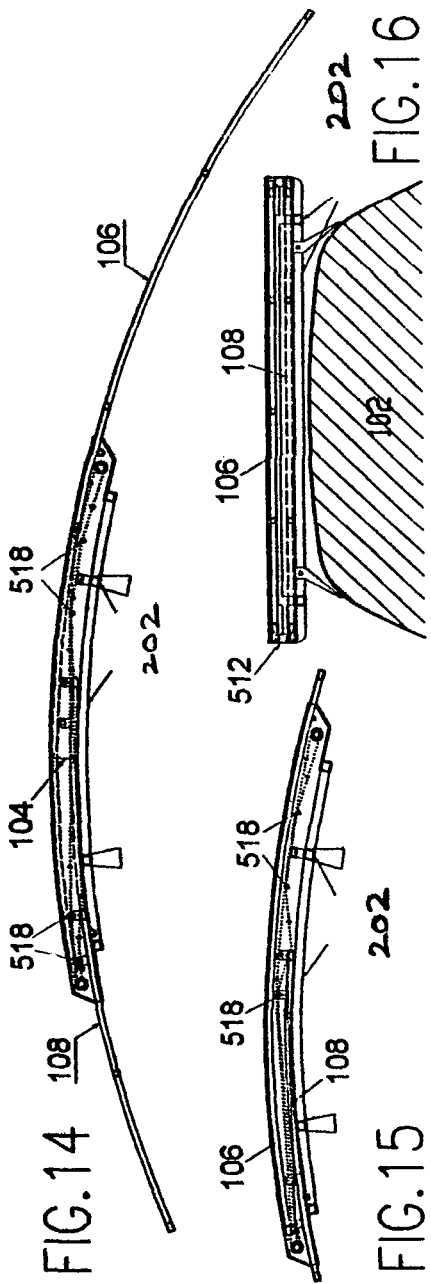

RETRACTABLE VEHICLE SHADE FOR TROPICAL AND COLD CLIMATES

CROSS-REFERENCE TO RELATED APPLICATIONS

This application is the U.S. National Stage of International Application No. PCT/IN2010/000193, filed Mar. 29, 2010, which claims the benefit of Indian Patent Application 633/DEL/2009, filed Mar. 27, 2009, both of which are hereby incorporated by reference to the extent not inconsistent with the disclosure herewith.

FIELD OF THE INVENTION

The present invention relates to the field of retractable vehicle shades. More particularly, the present invention relates to designing and developing a retractable vehicle shade which is suitable for providing protection to vehicles from general environment problems in tropical as well as cold climates.

BACKGROUND OF THE INVENTION

In tropical climates, it is observed that intense heat build-up takes place inside the vehicles which are parked under the sun. The body of the vehicle overheats in scorching summer sun due to 'green house' effect. Further, when the vehicles are parked in the open, dry leaves enter into vehicle crevices, rust spots are created on absorbing moisture, and the vehicle body/glass panes is exposed to bird droppings as well as rain, dust, dirt etc. Efforts to cover the vehicle with usual tarpaulin is not very beneficial as it leads to dampness being trapped inside the vehicle in rainy season resulting in rusting of various parts of the body. Further, spreading the tarpaulin cover over the vehicle, on a daily basis, is cumbersome and requires lot of time and effort.

In cold climates, it is observed that during the snowfall, thick layer of snow accumulates over the glass panes of the vehicle which are parked in the open, thereby making it difficult to use the vehicle just after snowfall. The process of manually removing the snow from the vehicle, especially from glass panes is quite difficult and time consuming.

Reference may be made to U.S. Pat. No. 6,206,451 which discloses a vehicle shade for safeguarding the vehicle from general environmental problems i.e. protection from sunshine, dust, dirt, chemicals, bird droppings, etc. The vehicle shade disclosed in the referenced patent tries to cover the top and all sides of the vehicle and provides a folding garage to fulfill this objective. Consequently, the vehicle shade occupies more space, especially if in a parking lot, apart from making the whole process cumbersome and time consuming.

Reference may be made to U.S. Pat. No. 4,848,827 which discloses an extendable roof structure which comprises front and rear roof panels and a power actuating mechanism to extend and retract roof panels out of and into a roof enclosure. However, a number of problems/limitations are associated with said vehicle shade. Firstly, the sliding panels of the shade do not fully cover the front, rear, as well as side panes of the vehicle, making them ineffective to protect the vehicle from direct sun rays in tropical climates and from snow in cold climates. Further, the panels projecting side ways apparently protrudes beyond the full width of the vehicle, thereby causing the vehicle to occupy more space in parking lots. The next problem associated with said structure is that the sliding panels of the referenced patent follow rigid geometry of rectangles and are conceived in flat profile, which do not go well with the arcuate profile of most of the motor vehicles. Moreover, the vehicle shade itself is kept exposed to vagaries of weather especially snow, where the ice is likely to penetrate in the box through crevices between the projecting panels and a central container box. There is no mechanism in the vehicle shade which restrict penetration of snow through the crevices between projecting panels and central container box. A major limitation of said shade is that the accumulated snow over the projecting panels of the vehicle shade makes retraction of panels inside the central container box difficult. The sliding panels cannot be retracted back into the central container box till the snow is completely removed from them. Moreover, a vehicle cannot be used for driving till the sliding panels are completely retracted back into box. Therefore, after a snowfall, a person has to either manually remove the snow from the sliding panels or wait till the snow melts away in order to use the vehicle, which is quite cumbersome and time consuming.

Hence, there is a need for a vehicle shade which could be temporarily or permanently attached to the vehicle, be easily and quickly operated by minimal effort, and is most effective to take care of all the problems enumerated above. The vehicle shade must follow the arcuate profile of the vehicle and should fully cover the front, rear, as well as side panes of the vehicle, thereby keeping the vehicle cool in tropical climates, and protecting all glass panes from snow accumulation during winter, apart from safeguarding the glass panes from dust, dirt, bird droppings, rain etc. The vehicle shade must restrict the penetration of snow inside a central box through crevices between projecting panels and the central box. Further, the vehicle shade should facilitate easy removal of accumulated snow from the vehicle and should not require a person to wait for snow to melt away or manually clean the glass panes after a snowfall. Moreover, in an open position, the vehicle shade should not be bigger than the vehicle body so that a vehicle with a vehicle shade can be parked normally'like other vehicles in a parking lot.

In order to meet the above-mentioned requirements, a retractable vehicle shade is invented, to protect most types of the vehicles from normal environmental problems likely to be met in any part of the world.

OBJECTS OF THE INVENTION

An object of the present invention is to provide a retractable vehicle shade which restricts intense heat build-up inside the vehicles parked under the sun.

Another object of the present invention is to provide a retractable vehicle shade which facilitates easy removal of snow from the vehicle after a snowfall.

Yet another object of the present invention is to provide a retractable vehicle shade which has an arcuate profile, flat profile or a combination of both.

Yet another object of the present invention is to provide a retractable vehicle shade which can be temporarily or permanently attached to the vehicle, and is easily and quickly operable by minimal effort.

Yet another object of the present invention is to provide a retractable vehicle shade which effectively covers the glass panes of the vehicle and does not occupy extra space when the vehicle is parked.

Further objects and advantages of the present invention will be clear in the ensuing description, claims and drawings.

STATEMENT OF THE INVENTION

According to one aspect of the present invention, there is provided a retractable vehicle shade for vehicles comprising a front glass pane, a rear glass pane and side glass panes, the shade comprising:

(a) a hollow central box mounted on a rooftop of the vehicle, said box comprising a covered top portion and two covered side portions with front and rear end of the box having end to end slots configured to allow smooth sliding movement of a front sliding panel and a rear sliding panel respectively;

(b) the front sliding panel slidingly fitted into said box through the slot at the front end, said front sliding panel being configured to cover at least front glass pane and adapted to be extended out from and retracted back into said box;

(c) the rear sliding panel slidingly fitted into said box through the slot at the rear end, said rear sliding panel being configured to cover at least rear glass pane and adapted to be extended out from and retracted back into said box; and (d) a water-proof stretchable fabric member having a central portion and two ends, said central portion being detach-ably attached to Stop portion of said box and said two ends being detach-ably connected to outer ends of said front and rear sliding panels respectively for providing a detachable layer over respective panels and central box, said fabric member having one or more elastic members, causing it to fold up along the end portions of the sliding panels on the top of the box when said panels are retracted backwards into said box.

SUMMARY OF THE INVENTION

Various embodiments of the present invention provide a retractable vehicle shade for vehicles comprising a front glass pane, a rear glass pane and side glass panes. The shade comprises a hollow central box mounted on a rooftop of the vehicle, wherein said box comprises a covered top portion and two covered side portions with, front and rear end of the box having end to end slots configured to allow smooth sliding movement of a front sliding panel and a rear sliding panel respectively. The front sliding panel is slidingly fitted into said box through the slot at the front end. The front sliding panel is configured to cover at least front glass pane and adapted to be extended out from and retracted back into said box. Further, the rear sliding panel is slidingly fitted into said box through the slot at the rear end. The rear sliding panel is configured to cover at least rear glass pane and adapted to be extended out from and retracted back into said box. The shade further comprises a water-proof stretchable fabric member having a central portion and two ends, said central portion being detach-ably attached to top portion of said box. Said two ends are detach-ably connected to outer ends of said front and rear sliding panels respectively for providing a detachable layer over respective panels and central box. Said fabric member have one or more elastic members, causing it to fold up along the end portions of the sliding panels on the top of the box when said panels are retracted backwards into said box.

In an embodiment of the present invention, the front and rear sliding panels comprises a profile being selected from a group consisting of an arcuate profile, a flat profile, or a combination thereof.

In an embodiment of the present invention central box, front and rear sliding panels comprises hollow square/rectangular or round members made of materials selected from a group consisting of stainless steel, aluminum, G.I. Sheet and poly vinyl chloride.

In an embodiment of the present invention, hollow members are covered with materials selected from a group consisting of tinted fibre glass, toughened tinted glass, solar panels and metal panels etc.

In an embodiment of the present invention, said central box comprises a sliding mechanism, consisting of two ball bearing units on each side of sliding panels at their internal ends when open, and sliding tracks for slidingly extending and retracting front and rear sliding panels from and into said box, the sliding mechanism comprising rotatably mounted pulleys and cables fabricated from nylon or steel wires.

In an embodiment of the present invention, the front and rear sliding panels are slidingly extended from and retracted into the box using a DC motor designed to rotate in a clock wise or anti clock wise direction for extending the front and rear sliding panels outside the box or retracting them back into the box, with remote control.

In another embodiment of the present invention, the front and rear sliding panels are slidingly extended from and retracted back into the box manually.

In an embodiment of the present invention, the DC motor receives electrical power from one or more storage batteries, which in turn are connected to solar panels attached to said box and sliding panels.

In an embodiment of the present invention, said box, sliding panels and fabric member comprise fasteners selected from a group comprising: clamps, pins, hooks, clips, snaps, and, Velcro® hook and loop fasteners.

In an embodiment of the present invention the fabric member has embedded heating elements for dislodging snow adhering to the fabric member.

In an embodiment of the present invention, the retractable vehicle shade comprises a water-proof stretchable fabric member that covers both the side panes of the vehicle along with the central box and the front and rear glass panes.

BRIEF DESCRIPTION OF THE ACCOMPANYING DRAWINGS

Now the invention will be described in detail with reference to the accompanying drawings in which:

FIG. 2 illustrates a retractable vehicle shade when its front and rear sliding panels are retracted inside its central box through respective slots;

Figure 1:
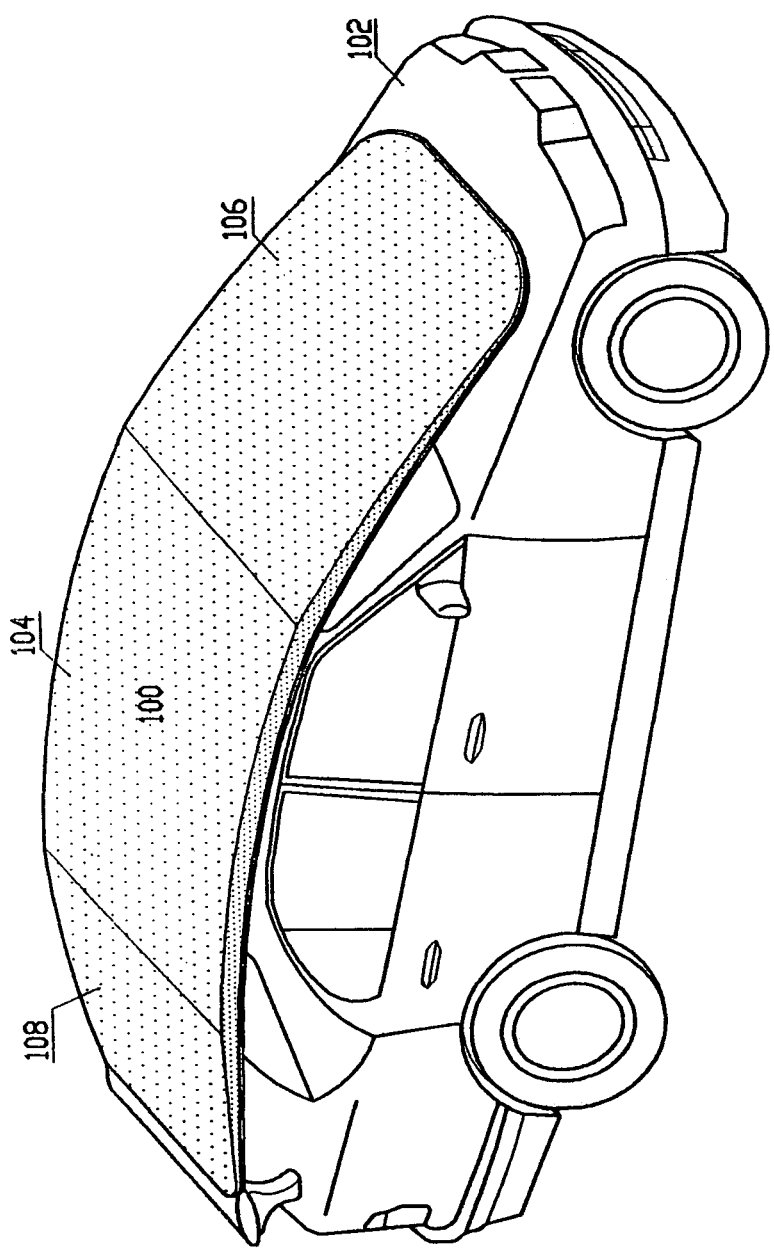
FIG. 1 illustrates perspective view of a retractable vehicle shade covering front and rear glass panes of a vehicle.
Figure 6:
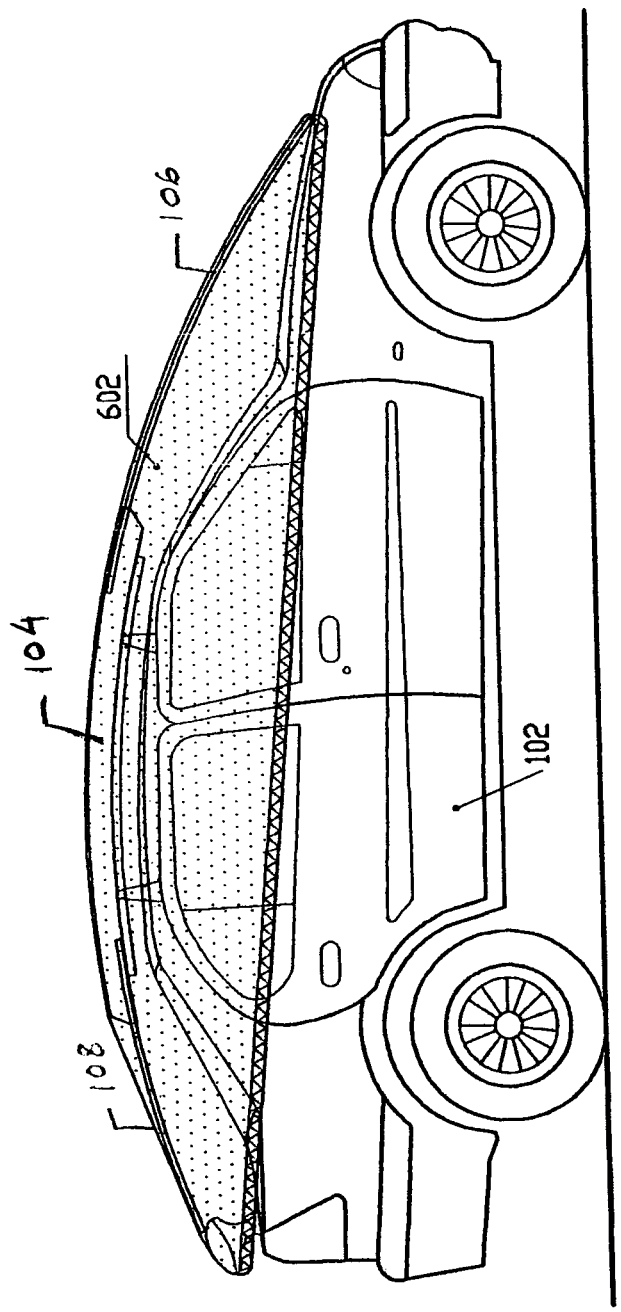
Figure 7:
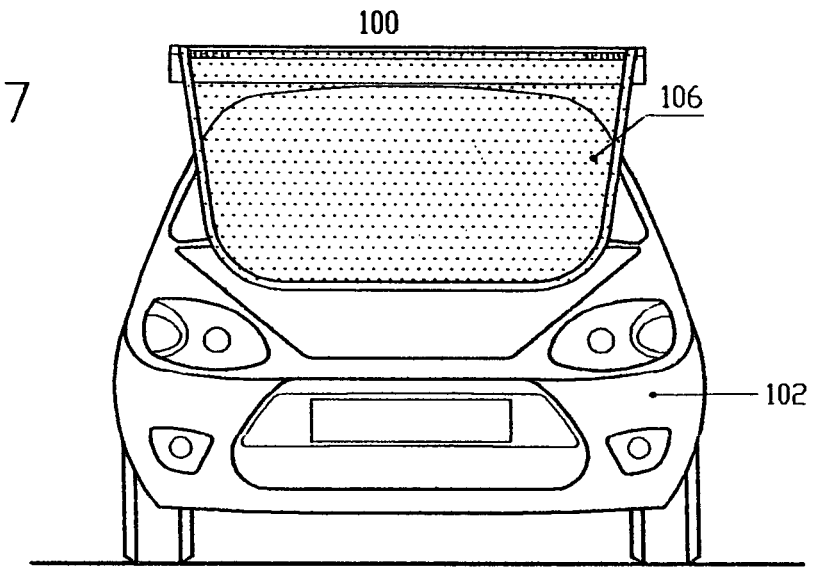
Figure 8:
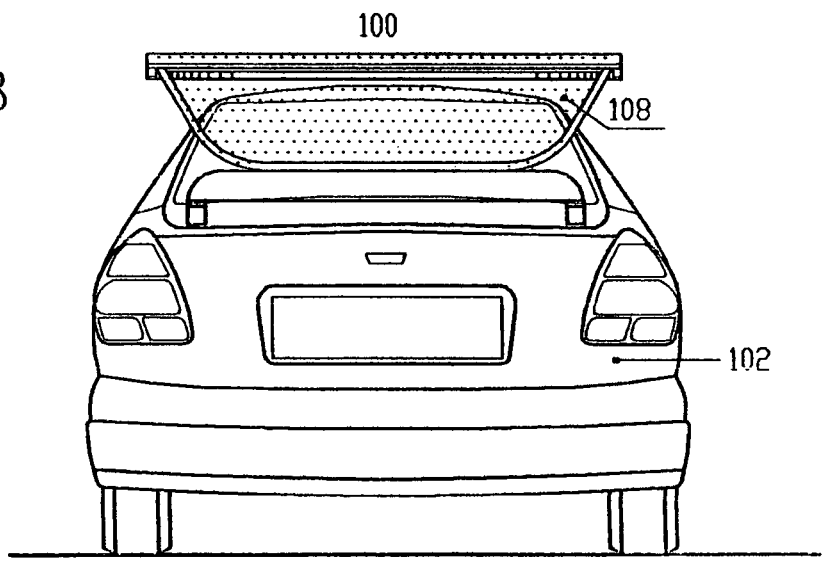
Figure 17:
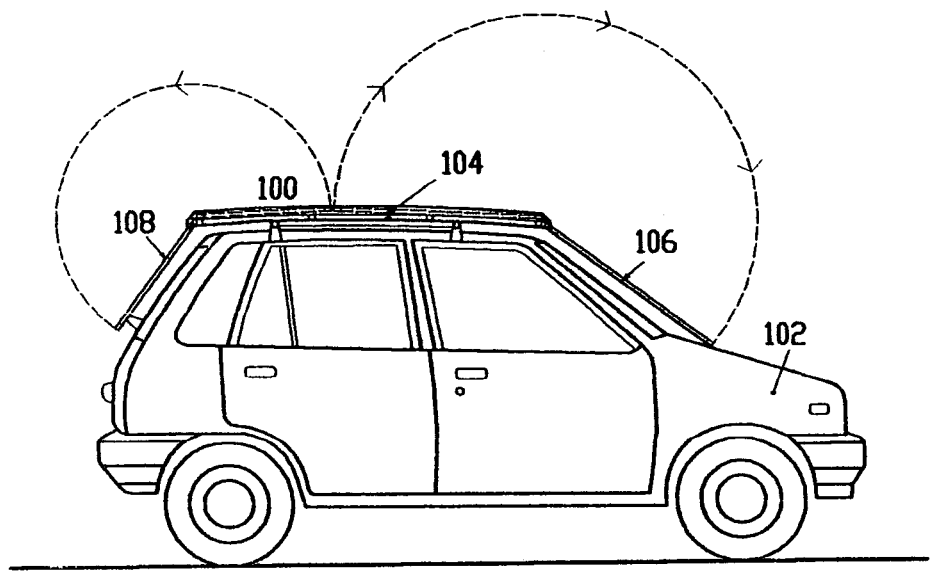
Figure 18:
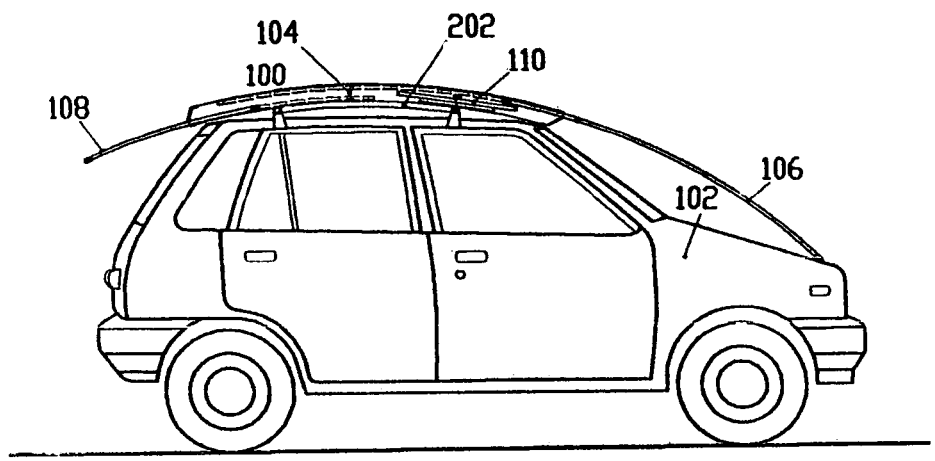
Figure 19:
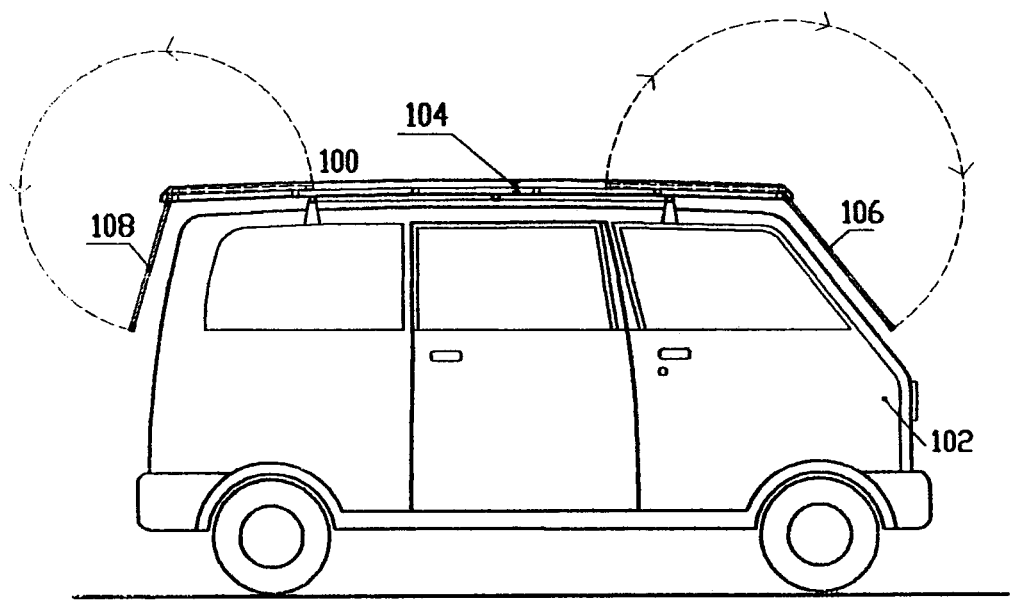
Figure 20:
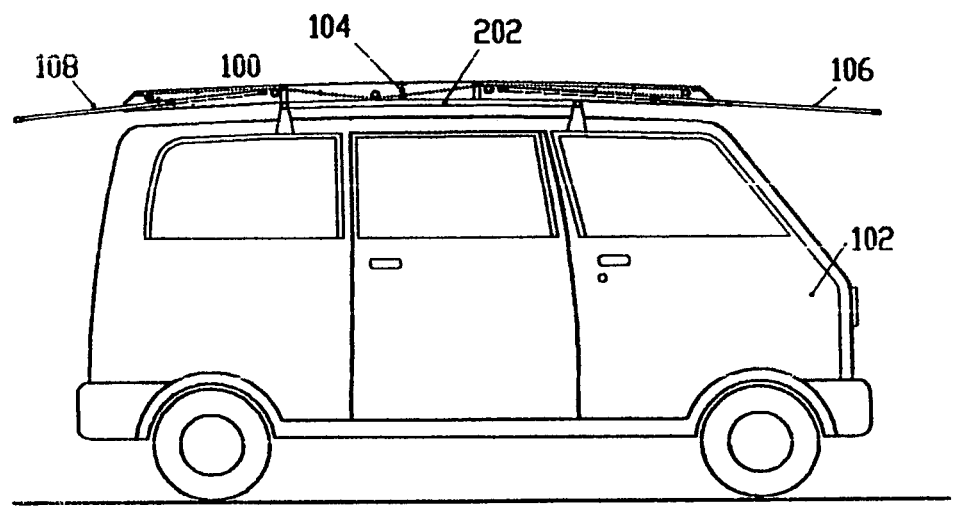

FIG. 3. illustrates a retractable vehicle shade when its front and rear sliding panels are extended out from a central box through respective slots;

FIG. 4 illustrates the profile of a water-proof stretchable fabric member of the retractable vehicle shade when its front and rear sliding panels are retracted into the central box;

FIG. 5 illustrates the profile of the water-proof stretchable fabric member covering the front and rear sliding panels when they are extended out from the central box;

FIG. 6 illustrates profile of a water-proof stretchable fabric covering the entire central box, sliding panels, and side panes of the vehicle;

FIG. 7 illustrates a front view of a vehicle when the front sliding panel of its retractable vehicle shade is extended out from the central box;

FIG. 8 illustrates a rear view of a vehicle when the rear sliding panel of its retractable vehicle shade is extended out from the central box;

FIG. 9 illustrates top view of the sliding mechanism and sliding tracks of the motorized retractable vehicle shade when its front and rear sliding panels are extended out from the central box, the sliding mechanism comprising support frame work, one or more pulleys and wire connections;

FIGS. 10 and 11 illustrate a longitudinal section of the sliding mechanism and sliding tracks of the motorized retractable vehicle shade when its front and rear sliding panels are extended out from and retracted back into the central box;

FIG. 12 illustrates cross section of the central box showing various details of the motorized retractable vehicle shade;

FIG. 13 illustrates top view of the sliding mechanism and sliding tracks of the manually operated retractable vehicle shade when its front and rear sliding panels are extended out, the sliding mechanism comprising support frame work, one or more pulleys, and wire connections etc;

FIGS. 14 and 15 illustrate longitudinal section of the sliding mechanism and sliding tracks of the manually operated retractable vehicle shade when its front and rear sliding panels are extended out from and retracted back into the central box;

FIG. 16 illustrates cross section of the central box showing various details of the manually operated retractable vehicle shade;

FIG. 17 illustrates a retractable vehicle shade for a hatchback having a flat central box and folding panels hinged to the central box;

FIG. 18 illustrates a retractable vehicle shade for a hatchback having an arcuate central box and sliding panels;

FIG. 19 illustrates a retractable vehicle shade for a van having an arcuate central box and manually folding front and rear sliding panels; and FIG. 20 illustrates a retractable vehicle shade for a van having an arcuate central box and front and rear manually sliding panels.

DESCRIPTION OF THE INVENTION WITH REFERENCE TO THE DRAWINGS

With reference to FIGS. 1-20, a retractable vehicle shade 100 is described for a vehicle 102 which comprises a front glass pane, a rear glass pane and side glass panes. Examples of vehicle 102 may include, but are not limited to, cars, sedans, hatchbacks, vans, and Sport Utility Vehicles (SUV). In an embodiment of the present invention, the vehicle shade 100 is mounted on the vehicle 102 to keep the vehicle cool in tropical climates, and/or protect all glass panes from snow accumulation during winter, and safeguard the glass panes from dust, dirt, bird droppings, rain etc. In an embodiment of the present invention, the vehicle shade 100 is mounted on top of the vehicle 102 in a manner similar to a luggage carrier. The retractable vehicle shade 100 can be temporarily or permanently attached to the vehicle 102, and can be easily and quickly operated by minimal effort.

The retractable vehicle shade 100 comprises a hollow central box 104, a front sliding panel 106 and a rear sliding panel 108. The hollow central box 104 is mounted on a rooftop of the vehicle 102 and comprises a covered top portion and two covered side portions. In an embodiment of the present invention, the hollow central box 104 completely covers the rooftop of the vehicle and acts as a sunshade for side panes of the vehicle 102.

In an embodiment of the present invention, the front sliding panel 106 is configured to cover at least front glass pane and is slidingly fitted into said box 104 through a slot 112 at the front end. In another embodiment of the present invention, the rear sliding panel 108 is configured to cover at least rear glass pane and is slidingly fitted into said box 104 through a slot 114 at the rear end. The end to end slots 112 and 114 are configured to allow smooth sliding movement of the front sliding panel 106 and the rear sliding panel 108 respectively. The front and rear sliding panels 106 and 108 are adapted to be extended out from and retracted back into said box 104. Box 104 comprises a sliding mechanism and sliding tracks for slidingly extending and retracting front and rear sliding panels 106 and 108 from and into box 104.

In various embodiments of the present invention, the central box 104, the front and rear sliding panels 106 and 108 may either have an arcuate profile or a flat profile or a combination of both based on the utility and type of vehicle.

The retractable vehicle shade 100 further comprises a detachably attached water-proof stretchable fabric member 302 for providing an additional water-proof layer over the central box 104 and the sliding panels 106 and 108. In an embodiment of the present invention, the fabric member 302 have sufficient width and length to cover the central box 104 and sliding panels 106 and 108, when they are extended out from box 104. The water-proof stretchable fabric member 302 comprises a central portion 402 and two end portions 404 and 406. The central portion 402 is detach-ably attached to top portion of central box 104 and the ends 404 and 406 are detach-ably connected to outer ends of front and rear sliding panels respectively. In an embodiment of the present invention, the fabric member 302 have one or more elastic members, which causes it to fold up along the end portions of the sliding panels on the top of the box 104 when said panels are retracted backwards into box 104. Further, material of fabric member shall be thin water-proof fabric similar to material used in traditional car covers. In an embodiment of the present invention, said box 104, sliding panels 106 and 108 and fabric member 302 may be attached to each other using one or more fasteners such as clamps, pins, hooks, clips, snaps, and, Velcro® hook and loop fasteners.

In an embodiment of the present invention, the retractable vehicle shade 100 comprises a stretchable fabric member 602 for covering side panes of the vehicle 102 along with central box 104 and sliding panels 106 and 108. The stretchable fabric member 602 is detachably attached to said central box 104 and provides protection to the vehicle from various environmental problems while parked for extended period of time.

In various embodiments of the present invention, when the fabric member (302, 602) is completely stretched over the central box 104 and the sliding panels 106 and 108, then during the snowfall, the penetration of snow through crevices between the sliding panels and the central box 104 is restricted. Further, the snow accumulated over the vehicle 102 in a snowfall is easily removed by detaching the fabric member (302, 602) from the central box 104.

In an embodiment of the present invention, the central box 104, front and rear sliding panels 106 and 108 are fabricated from hollow square/rectangular/round members made of materials such as stainless steel, aluminum and poly vinyl chloride. Further, these hollow square/round members may be covered with materials such as tinted fibre glass, toughened tinted glass, solar panels, metal panels, etc. The materials such as tinted fibre glass facilitates free air flow around the vehicle body 102, thereby restricting intense heat build-up inside the vehicles parked under the sun or dampness building up in rainy season leading to rust catching up in the whole vehicle body 102.

In an embodiment of the present invention, the front and rear sliding panels 106 and 108 of the retractable vehicle shade 100 are slidingly extended from and retracted into the box 102 either manually or through remote control. The vehicle shade 100 comprises one or more rotatably mounted pulleys 110 and metal section support frame 202 to allow smooth sliding movement of sliding panels from and into box 104 respectively using a remotely controlled DC motor. Further, the vehicle shade 100 comprises vertical pulleys at both ends of the central box 104 connected with wires and operable through large and small pulleys with spacers between to ensure smooth flow of wires manually.

In various embodiments of the present invention, the sliding mechanism inside the central box 104 comprises hooks 502 and 504 to pull front and rear sliding panels in forward and reverse direction respectively, directional pulley 506, main bigger rotating pulley 508, main smaller rotating pulley 510, both connected to each other around the DC motor capable to rotate both in clock-wise and anti-clock-wise direction, vertical rotating pulleys 516, sliding tracks 512 on both side of box 104, main rotating rod 514 for vertical pulleys 516, horizontal rotating spacer rods 518 for wires separation, pulling wires 520 for sliding panels, and base support frame 202 for fixing main central box 104 to the vehicle 102. In an embodiment of the present invention, the cables/steel wires 520 are fabricated from nylon or steel.

In an embodiment of the present invention, the fabric member (302, 602) may have embedded heating elements for dislodging snow adhering to it. In another embodiment of the present invention, the DC motor may receive electrical power from one or more storage batteries, which in turn are connected to solar panels attached to said box 104 and sliding panels 106 and 108. The sliding panels 106 and 108 may have integrated solar panels to produce sufficient amount of electric energy for vehicles such as electric cars. The feature of solar panels may also be useful for storing enough power for introducing automatic and remote control mechanisms, heating mechanisms in winter and air-conditioning in summer.

The subject application is a mere statement of invention, where many alternations and modifications are possible without deviating from the scope of the invention. The subject disclosure is for illustrative purposes only, hence the same should not be construed to restrict the scope of the invention.

I claim:

1. A retractable vehicle shade for vehicles comprising a front glass pane, a rear glass pane and side glass panes, the shade comprising:
   (a) a hollow central box mounted on a rooftop of the vehicle, said box comprising a covered top portion and two covered side portions with front and rear end of the box having end to end slots configured to allow smooth sliding movement of a front sliding panel and a rear sliding panel respectively;
   (b) the front sliding panel slidingly fitted into said box through the slot at the front end, said front sliding panel being configured to cover at least front glass pane and adapted to be extended out from and retracted back into said box;
   (c) the rear sliding panel slidingly fitted into, said box through the slot at the rear end, said rear sliding panel being configured to cover at least rear glass pane and adapted to be extended out from and retracted back into said box; and
   (d) a water-proof stretchable fabric member having a central portion and two ends, said central portion being detach-ably attached to top portion of said box and said two ends being detach-ably connected to outer ends of said front and rear sliding panels respectively for providing a detachable layer over respective panels and central box, said fabric member having one or more elastic members, causing it to fold up along the end portions of the sliding panels on the top of box, when said panels are retracted backwards into said box.

2. The retractable vehicle shade as claimed in claim 1, wherein said central box, front and rear sliding panels comprises a profile selected from a group consisting of a arcuate profile, a flat profile, or a combination thereof.

3. The retractable vehicle shade as claimed in claim 1, wherein said central box, front and rear sliding panels comprises hollow square or round members made of materials selected from a group consisting of stainless steel, aluminum and poly vinyl chloride.

4. The retractable vehicle shade as claimed in claim 3, wherein said hollow members are covered with materials selected from a group consisting of tinted fibre glass, toughened tinted glass, solar panels and metal panels.

5. The retractable vehicle shade as claimed in claim 1, wherein said central box comprises a sliding mechanism and sliding tracks for slidingly extending and retracting front and rear sliding panels from and into said box, the sliding mechanism comprising rotatably mounted pulleys and at least one of cables and wires fabricated from nylon or steel.

6. The retractable vehicle shade as claimed in claim 5, wherein the front and rear sliding panels are slidingly extended from and retracted into the box manually.

7. The retractable vehicle shade as claimed in claim 5, wherein the front and rear sliding panels are slidingly extended from and retracted into the box using a DC motor.

8. The retractable vehicle shade as claimed in claim 7, wherein the DC motor receives electrical power from one or more storage batteries, which in turn are connected to solar panels attached to said box and sliding panels.

9. The retractable vehicle shade as claimed in claim 1, wherein said box, sliding panels and fabric member comprise fasteners selected from a group comprising: clamps, pins, hooks, clips, snaps, and, hook and loop fasteners.

10. The retractable vehicle shade for a vehicle as claimed in claim 1, wherein the fabric member has embedded heating elements for dislodging snow adhering to the fabric member.

* * * * *